US012641366B2

(12) United States Patent
Park et al.

(10) Patent No.: US 12,641,366 B2
(45) Date of Patent: May 26, 2026

(54) SOUND SOURCE SEPARATION DEVICE

(71) Applicant: mpWAV Inc., Seoul (KR)

(72) Inventors: Hyung Min Park, Seoul (KR); Byung Joon Cho, Seoul (KR)

(73) Assignees: MPWAV INC., Seoul (KR); SOGANG UNIVERSITY RESEARCH & BUSINESS DEVELOPMENT FOUNDATION, Seoul (KR)

( * ) Notice: Subject to any disclaimer, the term of this patent is extended or adjusted under 35 U.S.C. 154(b) by 295 days.

(21) Appl. No.: 18/495,736

(22) Filed: Oct. 26, 2023

(65) Prior Publication Data

US 2024/0365060 A1 Oct. 31, 2024

(30) Foreign Application Priority Data

Apr. 28, 2023 (KR) ........................ 10-2023-0055998

(51) Int. Cl.
*H04R 3/00* (2006.01)

(52) U.S. Cl.
CPC .................................... *H04R 3/005* (2013.01)

(58) Field of Classification Search
CPC ......... G10L 25/18; G10L 25/90; G10L 25/27; G10L 25/48; G10K 11/178; G06N 3/08; H04R 3/005
See application file for complete search history.

(56) References Cited

U.S. PATENT DOCUMENTS

| | | | | |
|---|---|---|---|---|
| 9,668,066 | B1 * | 5/2017 | Betts | H04R 25/40 |
| 2019/0122674 | A1 * | 4/2019 | Wang | G10L 19/008 |
| 2019/0318757 | A1 * | 10/2019 | Chen | G10L 17/18 |

FOREIGN PATENT DOCUMENTS

| | | | |
|---|---|---|---|
| KR | 10-1133308 | B1 | 3/2012 |
| KR | 10-2012-0066134 | A | 6/2012 |
| KR | 10-2019-0091061 | A | 8/2019 |
| KR | 10-2022-0130875 | A | 9/2022 |

* cited by examiner

*Primary Examiner* — Rasha S Al Aubaidi
(74) *Attorney, Agent, or Firm* — ArentFox Schiff LLP; Yun H. Choe

(57) ABSTRACT

A sound source separation device according to an embodiment of the present disclosure includes a plurality of microphones, a matrix unit, and an output unit. The plurality of microphones may receive a plurality of microphone input signals transmitted from a plurality of sound sources. The matrix unit generates an objective function according to an estimated source vector and an estimated noise vector estimated based on the plurality of microphone input signals, and replace a first term and a second term included in the objective function using a log-likelihood function to estimate a demixing matrix. The output unit provides output vectors calculated based on the microphone input signals and the demixing matrix.

20 Claims, 5 Drawing Sheets

SOUND SOURCE SEPARATION DEVICE

CROSS-REFERENCE TO RELATED APPLICATION

This application claims the benefit of Korean Patent Application No. 10-2023-0055998, filed Apr. 28, 2023, which now issued Korean Patent No. 10-2584185 on Sep. 25, 2023, the contents of each of which are incorporated herein by reference.

BACKGROUND

Field

The present disclosure relates to a sound source separation device.

A sound input signal input through a microphone may include not only a target voice required for voice recognition but also noise that interferes with voice recognition. Various researches are being conducted to improve the performance of the voice recognition by removing noise from the sound input signal and extracting only the desired target voice.

SUMMARY

The present disclosure provides a sound source separation device capable of more accurately separating voice signals transmitted from each of the plurality of sound sources by generating an objective function according to an estimated source vector and an estimated noise vector estimated based on a plurality of microphone input signals, replacing a first term and a second term included in the objective function using a log-likelihood function, and maximizing the log likelihood function under constraints that a third term included in the objective function is not negative to estimate a demixing matrix.

According to an aspect of the present disclosure, a sound source separation device may include a plurality of microphones, a matrix unit, and an output unit. The plurality of microphones may receive a plurality of microphone input signals transmitted from a plurality of sound sources. The matrix unit may generate an objective function according to an estimated source vector and an estimated noise vector estimated based on the plurality of microphone input signals, and replace a first term and a second term included in the objective function using a log-likelihood function to estimate a demixing matrix. The output unit may provide output vectors calculated based on the microphone input signals and the demixing matrix.

A third term included in the objective function may be greater than or equal to 0.

A Lagrangian function may be maximized to maximize the log-likelihood function under a constraint that the third term is not negative.

The Lagrangian function may be separated into Lagrangian functions for each frequency, and the Lagrangian function may be maximized by independently maximizing the Lagrangian functions for each frequency with respect to all frequencies.

A variance of the estimated source vector may be calculated by performing partial differentiation on the Lagrangian function with respect to a variance of the estimated source vector.

The sound source separation device may further include a first variance estimator. The first variance estimator may estimate the variance of the estimated source vector according to the microphone input signals.

The sound source separation device may further include a first mask unit. The first mask unit may provide the variance of the estimated source vector using a first mask applied to the microphone input signals.

The variance of the estimated noise vector may be calculated by performing partial differentiation on the Lagrangian function with respect to a variance of the estimated noise vector.

The variance of the estimated noise vector may be a constant greater than 0.

The sound source separation device may further include a second variance estimator. The second variance estimator may estimate the variance of the estimated noise vector according to the microphone input signals.

The sound source separation device may further include a second mask unit. The second mask unit may provide the variance of the estimated source vector using a second mask applied to the microphone input signals.

The sound source separation device may further include a matrix calculation unit. A matrix calculation unit may calculate an estimated source demixing matrix and an estimated noise demixing matrix included in the demixing matrix, respectively, according to each of the estimated source vector and the estimated noise vector.

The estimated source demixing matrix may be calculated by sequentially calculating the estimated source demixing vectors.

The estimated noise demixing matrix may be calculated by sequentially calculating the estimated noise demixing vectors.

The estimated noise demixing matrix may be calculated by the estimated source demixing matrix.

A determinant of the demixing matrix from which the estimated source demixing vector is updated may be a reciprocal of a conjugate determinant of the demixing matrix before the estimated source demixing vector is updated.

The determinant of the demixing matrix from which the estimated noise demixing vector is updated may be the reciprocal of the conjugate determinant of the demixing matrix before the estimated noise demixing vector is updated.

The demixing matrix may be initialized as an identity matrix, and after the initialization, the determinant of the demixing matrix may always be maintained as 1.

The estimated source demixing vector may be calculated according to an estimated source spatial covariance inverse matrix and a demixing inverse matrix.

The estimated noise demixing vector may be calculated according to an estimated noise spatial covariance inverse matrix and the demixing inverse matrix.

The spatial covariance inverse matrix for the estimated source may be recursively calculated using the variance of the estimated source vector and the spatial covariance inverse matrix for the previous time estimated source.

The spatial covariance inverse matrix for the estimated source may be initialized using the identity matrix.

The spatial covariance inverse matrix for the estimated noise may be recursively calculated using the variance of the estimated noise vector and the spatial covariance inverse matrix for the previous time estimated noise.

The spatial covariance inverse matrix for the estimated noise may be initialized using the identity matrix.

The demixing inverse matrix may be calculated using the estimated source demixing matrix.

The demixing inverse matrix may be calculated using the estimated noise demixing vector.

In addition to the technical problems of the present disclosure described above, other features and advantages of the present disclosure will be described below, or may be clearly understood by those skilled in the art from such description and explanation.

DETAILED DESCRIPTION

Figure 1:
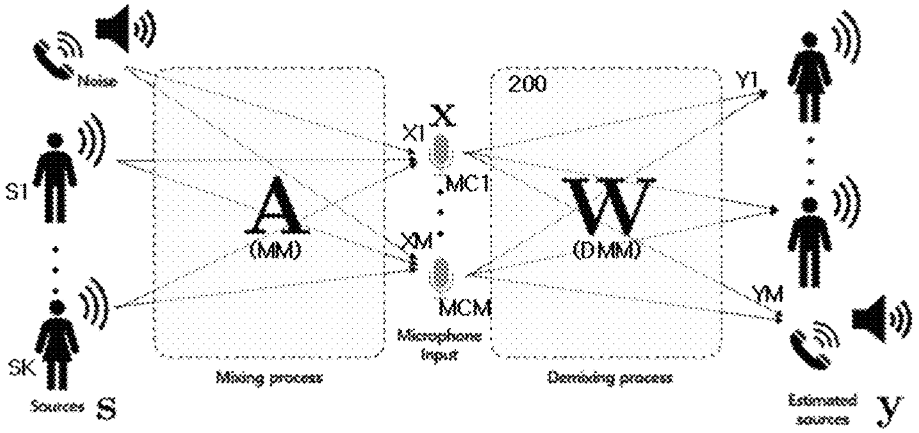
FIG. 1 is a diagram for describing a sound source separation device according to embodiments of the present disclosure.

In the specification, in adding reference numerals to components throughout the drawings, it is to be noted that like reference numerals designate like components even though components are shown in different drawings.

On the other hand, the meaning of the terms described in the present specification should be understood as follows.

Singular expressions should be understood as including plural expressions, unless the context clearly defines otherwise, and the scope of rights should not be limited by these terms.

Also, it should be understood that terms such as "include" and "have" do not preclude the existence or addition possibility of one or more other features or numbers, steps, operations, components, parts, or combinations thereof.

Hereinafter, preferred embodiments of the present disclosure designed to solve the above problems will be described in detail with reference to the accompanying drawings.

A sound source separation device according to an embodiment of the present disclosure may include a plurality of microphones, a matrix unit, and an output unit. The plurality of microphones may receive a plurality of microphone input signals transmitted from a plurality of sound sources. The matrix unit may generate an objective function according to an estimated source vector and an estimated noise vector estimated based on the plurality of microphone input signals, and replace a first term and a second term included in the objective function using a log-likelihood function to estimate a demixing matrix. The output unit may provide output vectors calculated based on the microphone input signals and the demixing matrix.

According to a sound source separation device of the present disclosure, it is possible to more accurately separate voice signals transmitted from each of the plurality of sound sources by generating an objective function according to an estimated source vector and an estimated noise vector estimated based on a plurality of microphone input signals and replacing a first term and a second term included in the objective function using a log-likelihood function to estimate a demixing matrix.

Figure 2:
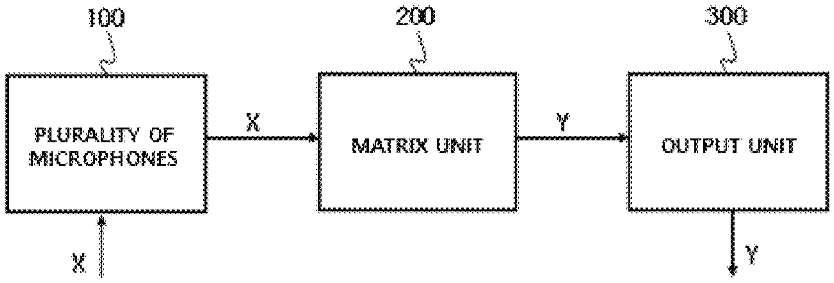
FIG. 2 is a diagram illustrating the sound source separation device according to the embodiments of the present disclosure.

FIG. 1 is a diagram illustrating a sound source separation device according to embodiments of the present disclosure, and FIG. 2 is a diagram illustrating the sound source separation device according to the embodiments of the present disclosure.

Referring to FIGS. 1 and 2, a sound source separation device 10 according to an embodiment of the present disclosure may include a plurality of microphones 100, a matrix unit 200, and an output unit 300. The plurality of microphones 100 may receive a plurality of microphone input signals X transmitted from a plurality of sound sources S. For example, the plurality of sound sources S may include a first to Kth sound sources S1 to SK, and the plurality of microphones 100 may include a first to Mth microphones MC1 to MCM. Here, M and K may be natural numbers, and K may be less than or equal to M. Voice signals generated from the first to Kth sound sources S1 to SK may be transmitted to the first to Mth microphones MC1 to MCM through a space between the first to Kth sound sources S1 to SK and the first to Mth microphones MC1 to MCM. A transfer function corresponding to the space between the first to Kth sound sources S1 to SK and the first to Mth microphones MC1 to MCM may be represented by A. Here, A may be a mixing matrix MM. In addition, the sound source separation device 10 according to the present disclosure may be applied even when the number K of sound sources and the number M of microphones are the same.

The matrix unit 200 may generate an objective function according to an estimated source vector and an estimated noise vector estimated based on the plurality of microphone input signals X. For example, the estimated source vector and estimated noise vector may be calculated through [Equation 1] to [Equation 6] below.

$$x_{t,f} = A_{t,f}\begin{bmatrix} s_{t,f} \\ n_{t,f} \end{bmatrix} = A_{t,f}^{(s)}s_{t,f} + A_{t,f}^{(n)}n_{t,f} \quad \text{[Equation 1]}$$

Here, $X_{t,f}$ may be the microphone input signal, t may be time, f may be frequency, $A_{t,f}$ may be the mixing matrix, $S_{t,f}$ may be the source vector, and $n_{t,f}$ may be the noise vector.

$$\begin{bmatrix} y_{t,f} \\ z_{t,f} \end{bmatrix} = W_{t,f}x_{t,f} \quad \text{[Equation 2]}$$

Here, $y_{t,f}$ may be the estimated source vector, $z_{t,f}$ may be the estimated noise vector, $W_t$ may be a demixing matrix, $X_{t,f}$ may be the microphone input signal, t may be time, and f may be the frequency.

$$y_{t,f} = W_{t,f}^{(s)}x_{t,f} \quad \text{[Equation 3]}$$

Here, $y_{t,f}$ may be the estimated source vector, $$W_{t,f}^{(s)}$$

may be the demixing matrix for the estimated source vector, $X_{t,f}$ may be the microphone input signal, t may be time, and f may be the frequency.

$$W_{t,f}^{(s)} = [w_{1,t,f}, \ldots, w_{K,t,f}]^H \quad \text{[Equation 4]}$$

Here, $w_{1,t,f}, \ldots, w_{K,t,f}$ may be the first to Kth estimated source demixing vectors, and H is a Hermitian transpose.

$$z_{t,f} = W_{t,f}^{(n)} x_{t,f} \quad \text{[Equation 5]}$$

Here, $z_{t,f}$ may be an estimated noise vector, $$W_{t,f}^{(n)}$$

the demixing matrix for the estimated noise vector, $X_{t,f}$ may be the microphone input signal, t may be time, and f may be the frequency.

$$W_{t,f}^{(n)} = [w_{K+1,t,f}, \ldots, w_{M,t,f}]^H \quad \text{[Equation 6]}$$

Here, $w_{K+1,t,f}, \ldots, w_{M,t,f}$ may be the K+1th to Mth estimated noise demixing vectors, and H may be the Hermitian transpose.

In this case, the objective function may be expressed as mutual information between output vectors for all frequencies. Here, the plurality of sound sources S may be independently separated by finding the demixing matrix that minimizes the objective function. For example, the objective function may be represented by [Equation 7] below.

$$\begin{aligned} J(W_t) &= \mathcal{I}(\bar{y}_{1,t}; \ldots ; \bar{y}_{K,t}; \bar{z}_{K-1,t}; \ldots ; \bar{z}_{M,t}) \\ &= \sum_{k=1}^{K} \mathcal{H}(\bar{y}_{K,t}) + \sum_{m=K+1}^{M} \mathcal{H}(\bar{z}_{M,t}) - \mathcal{H}(\bar{y}_{1,t}; \ldots ; \bar{y}_{K,t}; \bar{z}_{K-1,t}; \ldots ; \bar{z}_{M,t}) \\ &= \sum_{k=1}^{K} E[G(\bar{y}_{K,t})] + \sum_{m=K-1}^{M} E[G(\bar{z}_{M,t})] - \sum_{f=1}^{F} \log|\det W_{t,f} + C \end{aligned} \quad \text{[Equation 7]}$$

Here, $J(W_t)$ may be the objective function, $\mathcal{I}$ may be the mutual information, $\mathcal{H}(\bullet)$ may be entropy, $\bar{y}_{k,t}$ may be the kth estimated source vector for all frequencies at time t, $\bar{z}_{m,t}$ may be the mth estimated noise vector for all frequencies at time t, $G(r)=-\log q(r)$ may be a contrast function, q(r) may be an assumed model probability density function for a random variable r, E[•] may be an expected value, and C may be a constant.

The matrix unit 200 may estimate the demixing matrix (DDM) by replacing the first term and second term included in the objective function using the log-likelihood function. For example, the log likelihood function used in the present disclosure can be represented as [Equation 8] below.

$$\mathcal{L}\left(W_t, \Lambda_t, \sum\nolimits_t\right) = -\sum_{k=1}^{K}\sum_{t=1}^{T}\left(F\log\left(\pi\lambda_{k,t} + \frac{\|\bar{y}_{k,t}\|^2}{\lambda_{k,t}}\right) - \right. \quad \text{[Equation 8]}$$

-continued $$\left. \sum_{m=K+1}^{M}\sum_{t=1}^{T}\sum_{f=1}^{F}\left(\log(\pi\sigma_{m,t,f}) + \frac{|Z_{m,t,f}|^2}{\sigma_{m,t,f}}\right) \right)$$

Here, $\mathcal{L}(W_t, \Lambda_t, \Sigma_t)$ may be the log likelihood function, $\lambda_{k,t}$ may be a variance of the kth estimated source vector at time t, $\bar{y}$k,t may be the estimated source vector, $Z_{m,t,f}$ may be the mth estimated noise constituting the estimated noise vector, and $\sigma_{m,t,f}$ may be the variance of the mth estimated noise vector at time t and frequency f.

In addition, here, the probability density function of the estimated source vector may be a spherical Gaussian distribution with time-varying variance as shown in [Equation 9] below.

$$p(\bar{y}_{k,t}) = \frac{1}{\pi^F \lambda_{k,t}^F} \exp\left(-\frac{\|\bar{y}_{k,t}\|^2}{\lambda_{k,t}}\right) \quad \text{[Equation 9]}$$

In addition, here, the probability density function of the estimated noise vector may be the Gaussian distribution with the time-varying variance as shown in [Equation 10] below.

$$p(\bar{z}_{m,t}) = \prod_{f=1}^{F} p(Z_{m,t,f}) = \prod_{f=1}^{F} \frac{1}{\pi\sigma_{m,t,f}} \exp\left(-\frac{|Z_{m,t,f}|^2}{\sigma_{m,t,f}}\right) \quad \text{[Equation 10]}$$

Assuming that the assumed model probability density functions of the first and second terms included in the objective function follow the probability density functions of [Equation 9] and [Equation 10], the relationship between the first term and the second term included in the objective function and the log likelihood function may be expressed as [Equation 11] below, and when replacing the first term and the second term included in the objective function with the log-likelihood function, in order to minimize the objective function, it is necessary to maximize the log-likelihood function.

$$\sum_{k=1}^{K} E[G(\bar{y}_{k,t})] + \sum_{m=K+1}^{M} E[G(\bar{z}_{m,t})] = \frac{1}{T}\mathcal{L}(W_t, \Lambda_t, \Sigma_t) \quad \text{[Equation 11]}$$

Here, $$\sum_{k=1}^{K} E[G(\bar{y}_{k,t})] + \sum_{m=K+1}^{M} E[G(\bar{z}_{m,t})]$$

may be the first term, $$\sum_{k=1}^{K} E[G(\bar{y}_{k,t})] + \sum_{m=K=1}^{M} E[G(\bar{z}_{m,t})]$$

may be the second term, $\mathcal{L}(W_t, \Lambda_t, \Sigma_t)$ may be the log-likelihood function, and T may be a constant.

In an embodiment, the sum of the first term and the second term included in the objective function is a product of (1/T) and the log-likelihood function, and T may be a constant greater than 0.

In an embodiment, the third term included in the objective function may be greater than or equal to 0. For example, the third term included in the objective function may be expressed as [Equation 12] below, and constraints are set to prevent the third term from being negative when maximizing the log-likelihood function to minimize the objective function, so the mutual information may be controlled to be minimized more effectively.

$$\text{Third Term} = \sum_{f=1}^{F} \log |\det W_{t,f}| \quad \text{[Equation 12]}$$

In an embodiment, the Lagrangian function may be maximized to maximize the log-likelihood function under a constraint that the third term is not negative. The Lagrangian function may be expressed as [Equation 13] below by applying the recursive least squares method.

$$J_t = -\sum_{k=1}^{K}\sum_{l=1}^{t}\gamma^{t-l}\left(F\log\left(\pi\lambda_{k,t} + \frac{\|\bar{y}_{k,l}\|^2}{\lambda_{k,l}}\right) - \sum_{m=K+1}^{M}\sum_{f=1}^{F}\sum_{l=1}^{t}\gamma^{t-l}\left(\log(\pi\sigma_{m,l,f}) + \frac{|Z_{m,l,f}|^2}{\sigma_{m,l,f}}\right) + \sum_{f=1}^{F}\beta_{t,f}\log|\det W_{t,f}|\right. \quad \text{[Equation 13]}$$

Here, $J_t$ may be the Lagrangian function at time t, $\beta_{t,f}$ may be a Lagrange multiplier at time t and frequency f, $\gamma$ may be a forgetting factor, and effectively minimizing the mutual information under the constraints that the third term is not negative may be expressed as maximizing the Lagrangian function $J_t$ at time t every t.

In an embodiment, the Lagrangian function may be separated into Lagrangian functions for each frequency, and the Lagrangian function may be maximized by independently maximizing the Lagrangian functions for each frequency with respect to all frequencies. The Lagrangian function at time t and frequency f may be represented by [Equation 14] below.

$$J_{t,f} = -\sum_{k=1}^{K} w_{k,t,f}^{H} R_{k,t,f} w_{k,t,f} - \sum_{m=K+1}^{M-K} w_{m,t,f}^{H} Q_{m,t,f} w_{m,t,f} + \beta_{t,f}\log|\det W_{t,f}| \quad \text{[Equation 14]}$$

Here, $J_{t,f}$ may be the Lagrangian function at time t and frequency f, $W_{k,t,f}$ may be the kth estimated source demixing vector, $W_{m,t,f}$ may be the mth estimated noise demixing vector, $R_{k,t,f}$ may be the spatial covariance matrix for the kth estimated source, and $Q_{m,t,f}$ may be the spatial covariance matrix for the mth estimated noise. The spatial covariance matrix for the kth estimated source and the spatial covariance matrix for the mth estimated noise may be represented by [Equation 15] and [Equation 16] below, respectively.

$$R_{k,t,f} = \sum_{l=1}^{t}\gamma^{t-l}\left(\frac{x_{t,f}x_{l,f}^{H}}{\lambda_{k,l}}\right) \quad \text{[Equation 15]}$$

$$Q_{m,t,f} = \sum_{l=1}^{t}\gamma^{t-l}\left(\frac{x_{l,f}x_{l,f}^{H}}{\sigma_{m,l,f}}\right) \quad \text{[Equation 16]}$$

Figure 3:
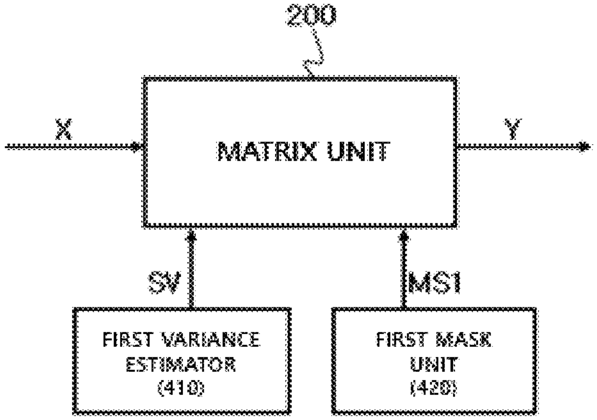
FIG. 3 is a diagram for describing an operation example of the sound source separation device of FIG. 2.

FIG. 3 is a diagram for describing an operation example of the sound source separation device of FIG. 2.

Referring to FIGS. 1 to 3, in an embodiment, the condition for maximizing the Lagrangian function may be determined according to the variance of the estimated source vector and the variance of the estimated noise vector. For example, the variance of the estimated source vector may be calculated by performing partial differentiation on the Lagrangian function with respect to the variance of the estimated source vector. In this case, the variance of the estimated source vector may be represented by [Equation 17] below.

$$\lambda_{k,t} = \frac{1}{F}\|\bar{y}_{k,t}\|^2 = \frac{1}{F}\sum_{f=1}^{F}|w_{k,t,f}^{H}x_{t,f}|^2 \quad \text{[Equation 17]}$$

Here, $\bar{y}_{k,t}$ may be the kth estimated source vector for all frequencies at time t, and F may be the number of frequencies.

In an embodiment, the sound source separation device 10 may further include a first variance estimator 410. The first variance estimator 410 may estimate the variance SV of the estimated source vector according to the microphone input signals X. For example, the first variance estimator 410 may perform deep learning on the input signals and the variance of the estimated source vector corresponding to the input signals, and the learned first variance estimator 410 may provide the variance SV of the estimated source vector corresponding to the microphone input signals.

In an embodiment, the sound source separation device 10 may further include a first mask unit 420. The first mask unit 420 may provide the variance of the estimated source vector using a first mask MS1 applied to the microphone input signals X. Here, the variance of the estimated source vector may be represented by [Equation 18] below.

$$\lambda_{k,t} = \frac{1}{MF}\sum_{f=1}^{F}\|\mathcal{M}_{k,t,f}^{(s)}x_{t,f}\|^2 \text{ or } \lambda_{k,t,f} \leftarrow \frac{1}{M}\|\mathcal{M}_{k,t,j}^{(s)}x_{t,f}\|^2 \quad \text{[Equation 18]}$$

Here, $$\mathcal{M}_{k,t,f}^{(s)}$$

may be the first mask and $\lambda_{k,t,f}$ may be the variance of the kth estimated source vector at time t and frequency f.

Figure 4:
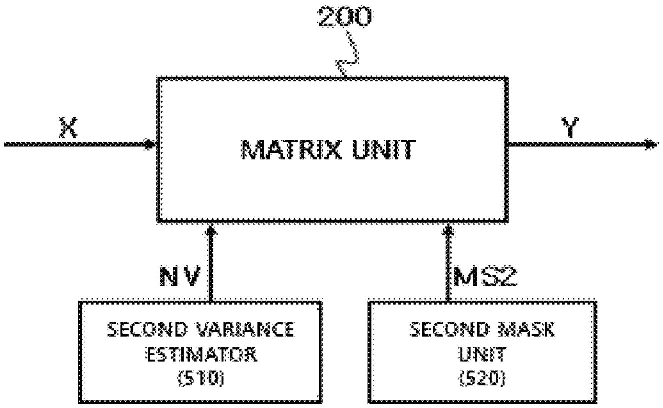
FIG. 4 is a diagram for describing another operation example of the sound source separation device of FIG. 2.

FIG. 4 is a diagram for describing another operation example of the sound source separation device of FIG. 2.

Referring to FIGS. 1 to 4, in an embodiment, the variance of the estimated noise vector may be calculated by performing partial differentiation on the Lagrangian function with respect to the variance of the estimated noise vector. In this case, the variance of the estimated noise vector may be represented by [Equation 19] below.

$$\sigma_{m,t,f} = |Z_{m,t,f}|^2 = |w_{m,t,f}^H x_{t,f}|^2 \quad \text{[Equation 19]}$$

Here, $Z_{m,t,f}$ may be the mth estimated noise constituting the estimated noise vector, and $\sigma_{m,t,f}$ may be the variance of the mth estimated noise vector.

In an embodiment, the variance of the estimated noise vector may be a constant greater than 0. For example, the variance of the estimated noise vector may be 1.

In an embodiment, the sound source separation device 10 may further include a second variance estimator 510. The second variance estimator 510 may estimate a variance NV of the estimated noise vector according to the microphone input signals X. For example, the second variance estimator 510 may perform deep learning on the input signals and the variance of the estimated noise vector corresponding to the input signals, and the learned second variance estimator 510 may provide the variance NV of the estimated noise vector corresponding to the microphone input signals.

In an embodiment, the sound source separation device 10 may further include a second mask unit 520. The second mask unit 520 may provide the variance of the estimated source vector using a second mask MS2 applied to the microphone input signals X.

Here, the variance of the estimated noise vector may be represented by [Equation 20] below.

$$\sigma_{m,t,f} \leftarrow \frac{1}{M}\left\|\mathcal{M}_{m,t,f}^{(n)} x_{t,f}\right\|^2 \quad \text{[Equation 20]}$$

Here, $$\mathcal{M}_{m,t,f}^{(n)}$$

may be the second mask.

Figure 5:
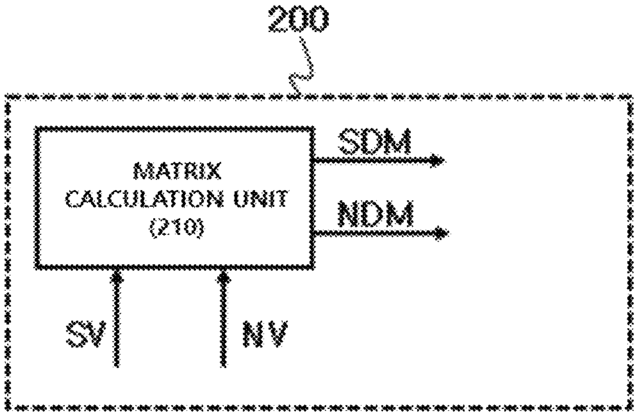
FIG. 5 is a diagram illustrating an example of a matrix unit included in the sound source separation device of FIG. 2.

FIG. 5 is a diagram illustrating an example of a matrix unit included in the sound source separation device of FIG. 2. Referring to FIGS. 1 to 5, in an embodiment, the sound source separation device 10 may further include a matrix calculation unit 210. The matrix calculation unit 210 may calculate an estimated source demixing matrix (SDM) and an estimated noise demixing matrix (NDM) included in the demixing matrix (DDM), respectively, according to each of the estimated source vector and the estimated noise, respectively.

In an embodiment, the estimated source demixing matrix SDM may be obtained by sequentially calculating the estimated source demixing vectors. For example, an optimized estimated source demixing vector may be calculated by performing partial differentiation on the Lagrangian function at time t and frequency f with respect to the estimated source demixing vector, and may be represented by [Equation 21] below.

$$\frac{\partial J_{t,f}}{\partial w_{k,t,f}^H} = -R_{k,t,f} w_{k,t,f} + \beta_{t,f} W_{t,f}^{-1} e_k = 0 \quad \text{[Equation 21]}$$

$$w_{k,t,f} = \beta_{t,f} R_{k,t,f}^{-1} W_{t,f}^{-1} e_m$$

$$\beta_{t,f} = \frac{1}{|\det\ W_{t,f}|^2} \frac{1}{(W_{t,f}^{-1} e_k)^H R_{k,t,f}^{-1} (W_{t,f}^{-1} e_k)}$$

Here, $w_{k,t,f}$ may be the kth estimated source demixing vector, $\beta_{t,f}$ may be the Lagrange multiplier, $\det W_{t,f}$ may be the determinant of the demixing matrix, ex may be a unit vector where the kth element is 1 and the remaining elements are 0, $R_{k,t,f}$ may be the spatial covariance matrix for the kth estimated source, and $$R_{k,t,f}^{-1}$$

may be the spatial covariance inverse matrix for the kth estimated source. For k having a value of 1 or greater and K or less, the estimated source demixing matrix (SDM) may be calculated by sequentially calculating the kth estimated source demixing vector.

In an embodiment, the estimated noise demixing matrix (NDM) may be calculated by sequentially calculating the estimated noise demixing vectors. For example, the optimized estimated noise demixing vector may be calculated by performing partial differentiation on the Lagrangian function at time t and frequency f with respect to the estimated noise demixing vector, and may be represented by [Equation 22] below.

$$\frac{\partial J_{t,f}}{\partial w_{m,t,f}^H} = -Q_{m,t,f} w_{m,t,f} + \beta_{t,f} W_{t,f}^{-1} e_m = 0 \quad \text{[Equation 22]}$$

$$w_{m,t,f} = \beta_{t,f} Q_{m,t,f}^{-1} W_{t,f}^{-1} e_m$$

$$\beta_{t,f} = \frac{1}{|\det\ W_{t,f}|^2} \frac{1}{(W_{t,f}^{-1} e_m)^H Q_{m,t,f}^{-1} (W_{t,f}^{-1} e_m)}$$

Here, $w_{m,t,f}$ may be the mth estimated noise demixing vector, $Q_{m,t,f}$ may be the spatial covariance matrix for the mth estimated noise, $$Q_{m,t,f}^{-1}$$

may be the spatial covariance inverse matrix for the mth estimated noise, $\beta_{t,f}$ may be the Lagrange multiplier, $\det W_{t,f}$ may be the determinant of the demixing matrix, $e_m$ may be a unit vector where the mth element is 1, and the remaining elements are 0. For m having a value of K+1 or greater and M or less, the estimated noise demixing matrix (NDM) may be calculated by sequentially calculating the mth estimated source demixing vector.

In an embodiment, the estimated noise demixing matrix (NDM) may be calculated by the estimated source demixing matrix (SDM). For example, assuming that the estimated source vector and the estimated noise vector are statistically uncorrelated, the estimated noise demixing matrix may be represented by [Equation 23] below.

$$W_{t,f}^{(n)} = [\overline{W}_{t,f}^{(n)} \mid -I_{M-K}] \quad \text{[Equation 23]}$$

Here, $$\overline{W}_{t,f}^{(n)}$$

may be the estimated noise demixing matrix at time t and frequency f, $$\overline{W}_{t,f}^{(n)}$$

may be the estimated noise demixing sub-matrix at time t and frequency f, and $I_{M-K}$ may be an identity matrix of size (M−K)×(M−K). The correlation function between the estimated source vector and the estimated noise vector has 0 because the estimated source vector and the estimated noise vector are assumed to be statistically uncorrelated, and may be represented by [Equation 24] below.

$$\begin{aligned} E[y_{t,f}z_{t,f}^H] &= E[W_{t,f}^{(s)}x_{t,f}x_{t,f}^H(W_{t,f}^{(n)})^H] \\ &= W_{t,f}^{(s)}E[x_{t,f}x_{t,f}^H](W_{t,f}^{(n)})^H \\ &= W_{t,f}^{(s)}E[x_{t,f}x_{t,f}^H]\begin{bmatrix} (\overline{W}_{t,f}^{(n)})^H \\ -I_{M-K} \end{bmatrix} = 0 \end{aligned} \quad \text{[Equation 24]}$$

Here, E[•] may be the expected value and $$W_{t,f}^{(s)}$$

may be the estimated source demixing matrix at time t and frequency f. The estimated noise demixing partial matrix according to [Equation 24] can be represented by [Equation 25] below.

$$\begin{aligned} E[y_{t,f}z_{t,f}^H] &= E[W_{t,f}^{(s)}x_{t,f}x_{t,f}^H(W_{t,f}^{(n)})^H] \\ &= W_{t,f}^{(s)}E[x_{t,f}x_{t,f}^H](W_{t,f}^{(n)})^H \\ &= W_{t,f}^{(s)}E[x_{t,f}x_{t,f}^H]\begin{bmatrix} (\overline{W}_{t,f}^{(n)})^H \\ -I_{M-K} \end{bmatrix} = 0 \end{aligned} \quad \text{[Equation 25]}$$

Here, $\overline{Q}_{t,f}$ may be the spatial covariance matrix for the microphone input signal at time t and frequency f, and may be represented by [Equation 26] below using the recursive least square method.

$$\overline{Q}_{t,f} = \sum_{l=1}^{t} \gamma^{t-l}(x_{l,f}x_{l,f}^H) \quad \text{[Equation 26]}$$

The estimated noise demixing partial matrix may be calculated through [Equation 25] and [Equation 26], and through this, the estimated noise demixing matrix of [Equation 23] may be calculated.

In an embodiment, the determinant of the demixing matrix from which the estimated source demixing vector is updated may be a reciprocal of a conjugate determinant of the demixing matrix before the estimated source demixing vector is updated. For example, the kth estimated source demixing vector may be represented by [Equation 27] below.

$$w_{k,t,f} = \frac{1}{\det W_{t,f}} \frac{R_{k,t,f}^{-1} b_{k,t,f}}{b_{k,t,f}^H R_{k,t,f}^{-1}(k) b_{k,t,f}} \quad \text{[Equation 27]}$$

Here, $b_{k,t,f}$ may be a kth column vector of an adjugate matrix of the demixing matrix $W_{t,f}$. The determinant of the demixing matrix in which the kth estimated source demixing vector is updated according to [Equation 27] may be represented by [Equation 28] below.

$$\det \hat{W}_{t,f} = w_{k,t,f}^H \hat{b}_{k,t,f} = \frac{1}{\det W_{t,f}^*} \frac{b_{k,t,f}^H R_{k,t,f}^{-1} \hat{b}_{k,t,f}}{b_{k,t,f}^H R_{k,t,f}^{-1}(k) b_{k,t,f}} = \frac{1}{\det W_{t,f}^*} \quad \text{[Equation 28]}$$

Here, $$\hat{W}_{t,f}$$

may be the demixing matrix in which the kth estimated source demixing vector is updated, $$\det \hat{W}_{t,f}$$

may be the conjugate determinant of the demixing matrix before the kth estimated source demixing vector is updated, and $$\hat{b}_{k,t,f}$$

may be the kth column vector included in the adjugate matrix of the demixing matrix in which the kth estimated source demixing vector is updated. The kth column vector included in the adjoint matrix of the demixing matrix with the kth estimated source demixing vector updated is calculated regardless of the kth estimated source demixing vector corresponding to the kth row vector of the demixing matrix, so $$\hat{b}_{k,t,f} = b_{k,t,f}$$

may be satisfied.

In an embodiment, the determinant of the demixing matrix from which the estimated noise demixing vector is updated may be the reciprocal of the conjugate determinant of the demixing matrix before the estimated noise demixing vector is updated. For example, the mth estimated noise demixing vector may be represented by [Equation 29] below.

$$w_{m,t,f}=\frac{1}{\det W_{t,f}}\frac{Q_{m,t,f}^{-1}b_{m,t,f}}{b_{m,t,f}^{H}Q_{m,t,f}^{-1}(k)b_{m,t,f}} \quad \text{[Equation 29]}$$

Here, $b_{m,t,f}$ may be a mth column vector of an adjugate matrix of the demixing matrix We,f. The determinant of the demixing matrix in which the mth estimated noise demixing vector is updated according to [Equation 29] may be represented by [Equation 30] below.

$$\det \tilde{W}_{t,f}=w_{m,t,f}^{H}\tilde{b}_{m,t,f}=\frac{1}{\det W_{t,f}^{*}}\frac{b_{m,t,f}^{H}Q_{m,t,f}^{-1}\tilde{b}_{m,t,f}}{b_{m,t,f}^{H}Q_{m,t,f}^{-1}b_{m,t,f}}=\frac{1}{\det W_{t,f}^{*}} \quad \text{[Equation 30]}$$

Here, $$\tilde{W}_{t,f}$$

may be the demixing matrix in which the mth estimated noise demixing vector is updated, det $$\det W_{t,f}^{*}$$

may be the conjugate determinant of the demixing matrix before the mth estimated noise demixing vector is updated, and $$\tilde{b}_{m,t,f}$$

may be the mth column vector included in the adjugate matrix of the demixing matrix in which the mth estimated noise demixing vector is updated. The mth column vector included in the adjoint matrix of the demixing matrix with the mth estimated noise demixing vector updated is calculated regardless of the mth estimated noise demixing vector corresponding to the mth row vector of the demixing matrix, so $\tilde{b}_{m,t,f}=b_{m,t,f}$ may be satisfied. In an embodiment, the demixing matrix may be initialized as an identity matrix, and after the initialization, the determinant of the demixing matrix may always be maintained as 1. In order for the calculated estimated source demixing vector of [Equation 21] and the estimated noise demixing vector of [Equation 22] to satisfy the optimal solution, a Karush-Kuhn-Tucker condition (KKT condition) should be satisfied, and the KKT condition may be represented by [Equation 31] below.

[Equation 31]

$$\frac{\partial J_{t,f}}{\partial w_{k,t,f}^{H}}\ni 0,\ \frac{\partial J_{t,f}}{\partial w_{k,t,f}^{H}}\ni 0 \quad (1)$$

$$\beta_{t,f}\geq 0 \quad (2)$$

$$\log|\det W_{t,f}|\geq 0 \quad (3)$$

$$\beta_{t,f}\log|\det W_{t,f}|\geq 0 \quad (4)$$

Here, the KKT condition (1) may be satisfied by [Equation 21] and [Equation 22]. In order to satisfy the KKT condition (2), it should be assumed that the spatial covariance matrix $R_{k,t,f}$ for the kth estimated source and the spatial covariance matrix $Q_{m,t,f}$ for the mth estimated noise are positive definite matrices, and when the time t in [Equation 15] and [Equation 16] is greater than the number M of microphones, the assumption of a positive definite matrix is generally established, and therefore, may be satisfied. In order to satisfy the KKT condition (3) and the KKT condition (4), it can be assumed that the demixing matrix $W_{0,f}$ at time 0 and frequency f is initialized with the identity matrix. In addition, due to [Equation 27] and [Equation 29], the demixing matrix determinant may always be maintained at 1.

In an embodiment, the estimated source demixing vector may be calculated according to an estimated d source spatial covariance inverse matrix and a demixing inverse matrix. For example, the update of the estimated source demixing vector may be represented by [Equation 32] below.

$$w_{k,t,f}=\frac{R_{k,t,f}^{-1}\left(W_{t,f}^{-1}e_k\right)}{\left(W_{t,f}^{-1}e_k\right)^{H}R_{k,t,f}^{-1}\left(W_{t,f}^{-1}e_k\right)} \quad \text{[Equation 32]}$$

Here, $w_{k,t,f}$ may be the kth estimated source demixing vector $$R_{k,t,f}^{-1}$$

may be the spatial covariance inverse matrix for the kth estimated source, $$W_{t,f}^{-1}$$

may be the demixing inverse matrix, and $e_k$ may be a unit vector where the kth element is 1 and the remaining elements are 0. The kth estimated source demixing vector may be sequentially updated for k having a value of 1 or greater and K or less, and through this, the estimated source demixing matrix may be updated.

In an embodiment, the estimated noise demixing vector may be calculated d according to the estimated noise spatial covariance inverse matrix and the demixing inverse matrix. For example, the update of the estimated noise demixing vector may be represented by [Equation 33] below.

$$w_{m,t,f}=\frac{Q_{m,t,f}^{-1}\left(W_{t,f}^{-1}e_m\right)}{\left(W_{t,f}^{-1}e_m\right)^{H}Q_{m,t,f}^{-1}\left(W_{t,f}^{-1}e_m\right)} \quad \text{[Equation 33]}$$

Here, $w_{m,t,f}$ may be the mth estimated noise demixing vector, $$Q_{m,t,f}^{-1}$$

may be the spatial covariance inverse matrix for the mth estimated noise, $$W_{t,f}^{-1}$$

may be the demixing inverse matrix, and $e_m$ may be a unit vector where the mth element is 1 and the remaining elements are 0. The mth estimated noise demixing vector may be sequentially updated for m having a value of K+1 or greater and M or less, and through this, the estimated noise demixing matrix may be updated.

In an embodiment, the spatial covariance inverse matrix for the estimated source may be recursively calculated using the variance of the estimated source vector and the spatial covariance inverse matrix for the previous time estimated source. For example, the spatial covariance inverse matrix for the estimated source may be represented by [Equation 34] below using matrix inversion lemma.

[Equation 34]

$$R_{k,t,f}^{-1} = \left[\sum_{l=1}^{t}\gamma^{t-l}\left(\frac{x_{l,f}x_{l,f}^{H}}{\lambda_{k,l}}\right)\right]^{-1} = \gamma^{-1}\left(R_{k,t-1,f}^{-1} - \frac{R_{k,t-1,f}^{-1}x_{t,f}x_{t,f}^{H}R_{k,t-1,f}^{-1}}{\gamma\lambda_{k,t} + x_{t,f}^{H}R_{k,t-1,f}^{-1}x_{t,f}}\right)$$

Here, $$R_{k,t,f}^{-1}$$

may be the spatial covariance inverse matrix for the kth estimated source at time t and frequency f, $\lambda_{k,t}$ may be the variance of the kth estimated source vector at time t, and $$R_{k,t-1,f}^{-1}$$

may be the spatial covariance inverse matrix for the kth estimated source at time t−1 and frequency f.

In an embodiment, the spatial covariance inverse matrix for the estimated source may be initialized using the identity matrix. For example, the initialization of the spatial covariance for the estimated source may be represented by [Equation 35] below.

$$R_{k,0,f}^{-1} = \rho^{(s)}I_M \qquad \text{[Equation 35]}$$

Here, $$R_{k,0,f}^{-1}$$

may be the spatial covariance inverse matrix for the kth estimated source at time 0 and frequency f, $I_M$ may be an identity matrix of size M×M, and $\rho^{(s)}$ may be a constant greater than 0. For example, $\rho^{(s)}$ may be 1 or $1e^{-6}$.

In an embodiment, the spatial covariance inverse matrix for the estimated noise may be recursively calculated using the variance of the estimated noise vector and the spatial covariance inverse matrix for the previous time estimated noise. For example, the spatial covariance inverse matrix for the estimated noise may be represented by [Equation 36] below using the matrix inversion lemma.

[Equation 36]

$$Q_{m,t,f}^{-1} = \left[\sum_{l=1}^{t}\gamma^{t-l}\left(\frac{x_{l,f}x_{l,f}^{H}}{\sigma_{m,l,f}}\right)\right]^{-1} = \gamma^{-1}\left(Q_{m,t-1,f}^{-1} - \frac{Q_{m,t-1,f}^{-1}x_{t,f}x_{t,f}^{H}Q_{m,t-1,f}^{-1}}{\gamma\sigma_{m,t,f} + x_{t,f}^{H}Q_{m,t-1,f}^{-1}x_{t,f}}\right)$$

Here, $$Q_{m,t,f}^{-1}$$

may be the spatial covariance inverse matrix for the mth estimated noise at time t and frequency f, $\sigma_{m,t,f}$ may be the variance of the mth estimated noise vector at time t, and frequency f, and $$Q_{m,t-1,f}^{-1}$$

may be the spatial covariance inverse matrix for the mth estimated noise at time t−1 and frequency f.

In an embodiment, the spatial covariance inverse matrix for the estimated noise may be initialized using the identity matrix. For example, the initialization of the spatial covariance for the estimated noise may be represented by [Equation 37] below.

$$Q_{m,0,f}^{-1} = \rho^{(n)}I_M \qquad \text{[Equation 37]}$$

Here, $$Q_{m,0,f}^{-1}$$

may be the spatial covariance inverse matrix for the mth estimated noise at time 0 and frequency f, $I_M$ may be an identity matrix of size M×M, and $\rho^{(n)}$ may be a constant greater than 0. For example, $\rho^{(n)}$ may be 1 or $1e^{-6}$.

In an embodiment, the demixing inverse matrix may be calculated using the estimated source demixing matrix. For example, the demixing inverse matrix may be represented by [Equation 38] below.

$$W_{t,f}^{-1} \leftarrow W_{t,f}^{-1} - \frac{W_{t,f}^{-1}e_k\Delta w_{k,t,f}^{H}W_{t,f}^{-1}}{1 + \Delta w_{k,t,f}^{H}W_{t,f}^{-1}e_k} = W_{t,f}^{-1} - W_{t,f}^{-1}e_k\Delta w_{k,t,f}^{H}W_{t,f}^{-1} \qquad \text{[Equation 38]}$$

Here, $$W_{t,f}^{-1}$$

may be the demixing inverse matrix at time t and frequency f, and $$\Delta w_{k,t,f}^{H}$$

may be the change amount of the kth H estimated source demixing vector at time t and frequency f.

$$\Delta w_{k,t,f}^{H} = w_{k,t,f}^{H} - e_k^T W_{t,f}$$

In an embodiment, the demixing inverse matrix may be calculated using the estimated noise demixing matrix. For example, the demixing inverse matrix may be represented by [Equation 39] below.

$$W_{t,f}^{-1} \leftarrow W_{t,f}^{-1} - \frac{W_{t,f}^{-1} e_m \Delta w_{m,t,f}^{H} W_{t,f}^{-1}}{1 + \Delta w_{m,t,f}^{H} W_{t,f}^{-1} e_m} = W_{t,f}^{-1} - W_{t,f}^{-1} e_k \Delta w_{m,t,f}^{H} W_{t,f}^{-1} \quad \text{[Equation 39]}$$

Here, $$W_{t,f}^{-1}$$

may be the demixing inverse matrix at time t and frequency f, and $$\Delta w_{m,t,f}^{H}$$

may be the change amount of the kth estimated noise demixing vector at time t and frequency f.

$$\Delta w_{m,t,f}^{H} = w_{m,t,f}^{H} - e_m^T W_{t,f}$$

The output unit 300 may provide the output vectors Y calculated based on the microphone input signals X and the demixing matrix (DDM). For example, the plurality of output vectors Y may include a first output vector Y1 to a Mth output vector YM. The first output vector Y1 to the Mth output vector YM may include signals separated for each sound source. The sound source separation device 10 according to the present disclosure may more accurately separate the voice signals transmitted from each of the plurality of sound sources by generating the objective function according to the estimated source vector and the estimated noise vector estimated based on the plurality of microphone input signals, replacing the first term and the second term included in the objective function using the log-likelihood function, and maximizing the log-likelihood function under the constraints that the third term included in the objective function is not negative to estimate the demixing matrix DDM.

According to the present disclosure as described above, there are the following effects.

According to a sound source separation device of the present disclosure, it is possible to more accurately separate voice signals transmitted from each of the plurality of sound sources by generating an objective function according to an estimated source vector and an estimated noise vector estimated based on a plurality of microphone input signals and replacing a first term and a second term included in the objective function using a log-likelihood function to estimate a demixing matrix.

In addition, other features and advantages of the present disclosure may be newly understood through the embodiments of the present disclosure.

In addition to the technical problems of the present disclosure described above, other features and advantages of the present disclosure will be described below, or may be clearly understood by those skilled in the art from such description and explanation.

What is claimed is:

1. A sound source separation device, comprising:

a plurality of microphones that receives a plurality of microphone input signals transmitted from a plurality of sound sources;

a matrix unit that generates an objective function according to an estimated source vector and an estimated noise vector estimated based on the plurality of microphone input signals, and replaces a first term and a second term included in the objective function using a log-likelihood function to estimate a demixing matrix; and an output unit that provides output vectors calculated based on the microphone input signals and the demixing matrix.

2. The sound source separation device of claim 1, wherein a third term included in the objective function is greater than 0.

3. The sound source separation device of claim 2, wherein a Lagrangian function is maximized to maximize the log-likelihood function under a constraint that the third term is not negative.

4. The sound source separation device of claim 3, wherein the Lagrangian function is separated into Lagrangian functions for and the Lagrangian function is maximized by each frequency, independently maximizing the Lagrangian functions for each frequency with respect to all frequencies.

5. The sound source separation device of claim 4, wherein a variance of the estimated source vector is calculated by performing partial differentiation on the Lagrangian function with respect to a variance of the estimated source vector.

6. The sound source separation device of claim 5, further comprising a first variance estimator that estimates the variance of the estimated source vector according to the microphone input signals.

7. The sound source separation device of claim 6, further comprising a first mask unit that provides the variance of the estimated source vector using a first mask applied to the microphone input signals.

8. The sound source separation device of claim 7, wherein the variance of the estimated noise vector is calculated by performing partial differentiation on the Lagrangian function with respect to the variance of the estimated noise vector.

9. The sound source separation device of claim 8, wherein the variance of the estimated noise vector is a constant greater than 0.

10. The sound source separation device of claim 9, further comprising a second variance estimator that estimates the variance of the estimated noise vector according to the microphone input signals.

11. The sound source separation device of claim 10, further comprising a second mask unit that provides the variance of the estimated source vector using a second mask applied to the microphone input signals.

12. The sound source separation device of claim 11, further comprising a matrix calculation unit that calculates an estimated source demixing matrix and an estimated noise demixing matrix included in the demixing matrix according to each of the estimated source vector and the estimated noise vector.

13. The sound source separation device of claim 12, wherein the estimated source demixing matrix is composed of estimated source demixing vectors, and the estimated source demixing vector is calculated according to an estimated source spatial covariance inverse matrix and a demixing inverse matrix.

14. The sound source separation device of claim 13, wherein the spatial covariance inverse matrix for the estimated source is recursively calculated using the variance of the estimated source vector and the spatial covariance inverse matrix for a previous time estimated source.

15. The sound source separation device of claim 14, wherein the demixing inverse matrix is calculated using the estimated source demixing vector.

16. The sound source separation device of claim 12, wherein the estimated noise demixing matrix is composed of estimated noise demixing vectors, and the estimated noise demixing vector is calculated according to the estimated noise spatial covariance inverse matrix and the demixing inverse matrix.

17. The sound source separation device of claim 16, wherein the spatial covariance inverse matrix for the estimated noise is recursively calculated using the variance of the estimated noise vector and the spatial covariance inverse matrix for the previous time estimated noise.

18. The sound source separation device of claim 17, wherein the demixing inverse matrix is calculated using the estimated noise demixing vector.

19. The sound source separation device of claim 18, wherein the estimated noise demixing matrix is calculated by the estimated source demixing matrix.

20. The sound source separation device of claim 12, wherein the demixing matrix is initialized as an identity matrix, and after the initialization, a determinant of the demixing matrix is always maintained as 1.

* * * * *